(12) United States Patent
Eiting et al.

(10) Patent No.: US 6,370,456 B2
(45) Date of Patent: Apr. 9, 2002

(54) METHOD FOR APPLYING CONTROL DATA FOR AN ELECTRONIC MOTOR VEHICLE CONTROL UNIT

(75) Inventors: Thomas Eiting, Regensburg; Klaus Lindner, Tegernheim; Josef Loibl, Regen, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/782,740

(22) Filed: Feb. 13, 2001

Related U.S. Application Data

(63) Continuation of application No. PCT/DE99/02373, filed on Aug. 3, 1999.

(30) Foreign Application Priority Data

Aug. 13, 1998 (DE) ........................................ 198 36 748

(51) Int. Cl.[7] ............................................. G05B 19/00
(52) U.S. Cl. .......................................... 701/33; 701/35
(58) Field of Search ............................... 701/1, 29, 33, 701/35, 102, 114, 115

(56) References Cited

U.S. PATENT DOCUMENTS 5,970,251 A * 10/1999 Zimmermann et al. ...... 395/709
6,108,598 A *  8/2000 Sumitani ..................... 701/29

FOREIGN PATENT DOCUMENTS

| DE | 41 07 052 A1 | 9/1992 |
| DE | 36 24 456 C2 | 11/1994 |
| DE | 195 00 453 A1 | 12/1995 |
| DE | 196 25 619 C2 | 4/1998 |
| EP | 0 589 067 A1 | 3/1994 |

* cited by examiner

Primary Examiner—Michael J. Zanelli
(74) Attorney, Agent, or Firm—Herbert L. Lerner; Laurence A. Greenberg; Werner H. Stemer

(57) ABSTRACT

A method is described that can be used to apply mass-produced control units without special application tools. In this context, a data record that is to be applied from a first memory area of a flash memory is copied over to a second memory area of the flash memory. The data that are to be applied are updated in sections in a RAM and are then written back to the second memory area. The applied control data record is finally copied back to its original positions in the first memory area.

12 Claims, 2 Drawing Sheets

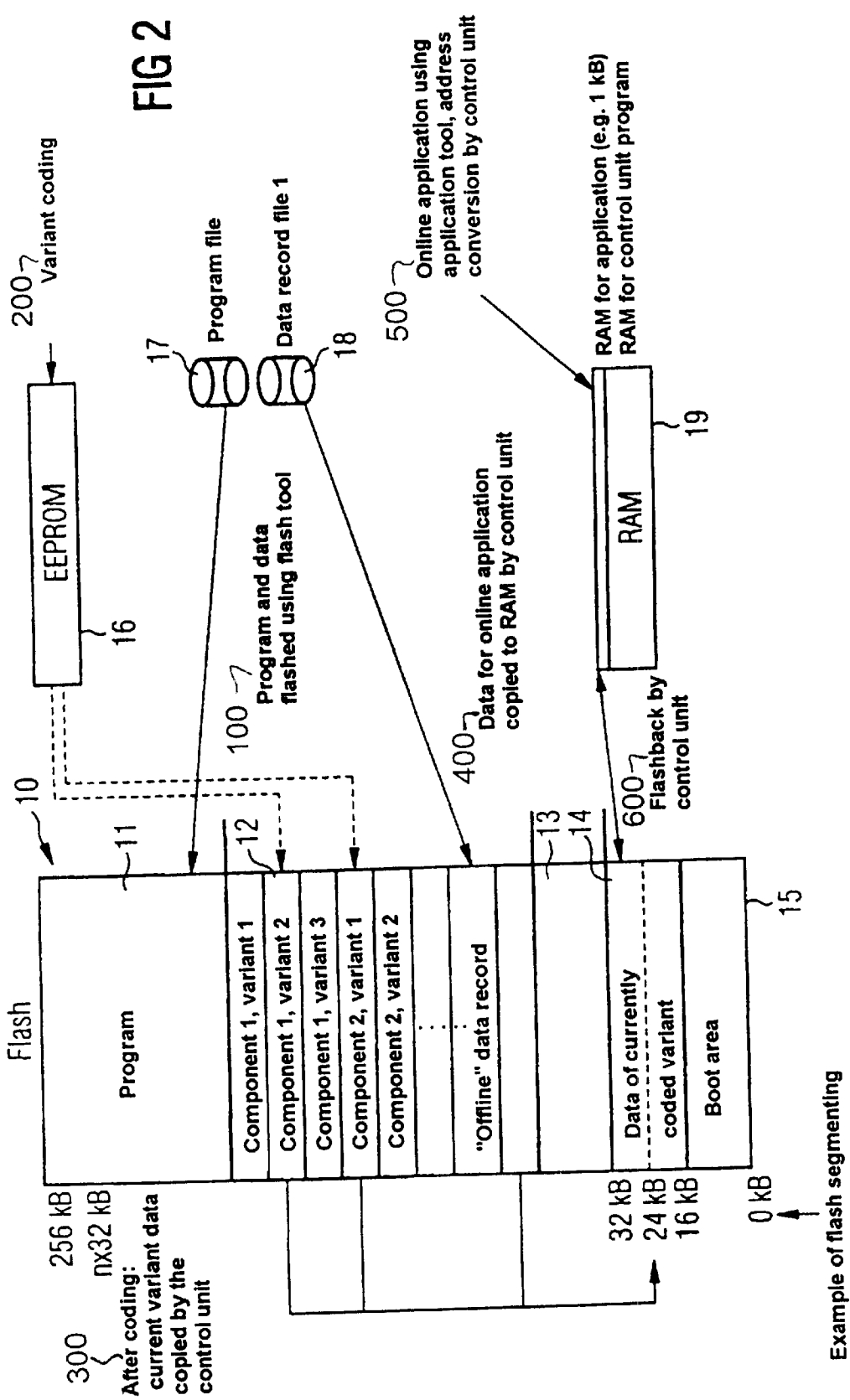

METHOD FOR APPLYING CONTROL DATA FOR AN ELECTRONIC MOTOR VEHICLE CONTROL UNIT

CROSS-REFERENCE TO RELATED APPLICATION

This application is a continuation of copending International Application No. PCT/DE99/02373, filed Aug. 3, 1999, which designated the United States.

BACKGROUND OF THE INVENTION

1. Field of the Invention:

The invention relates to a method for applying control data for one (or more) motor vehicle control unit(s) which contain(s) a nonvolatile memory, in particular a flash memory, for storing the control data. In this context, "applying" is understood to be matching, coordinating and/or updating control data that affect the current operation of the associated motor vehicle control unit. The data can be applied, by way of example, according to the respective control unit type, motor vehicle type or current operating response of the motor vehicle component which is to be controlled, for example an engine transmission system, in order thereby to optimize the operating response of the controlled motor vehicle component and hence of the entire motor vehicle.

It has recently been possible to identify the trend of increasingly replacing electronic control units provided independently (standalone control units) with integrated mechatronic units in which mechanical components (for example sensors and actuators on a plastic support and also electrical connecting elements) are provided in addition to the electronic domain (for example a transmission electronics circuit based on a substrate made of ceramic, for example). Such mechatronic control units can be used, for example, for engine control, transmission control, anti-lock brake system (ABS) control and the like. The invention relates both to such mechatronic control units and to purely electronic control units. On a general basis, the physical space available in control units is usually limited, which results in that the electronic components need to be of compact construction.

For applying motor vehicle functions, a nonvolatile memory usually contains parameters, characteristic curves and families of characteristic curves. In application methods already proposed, the data to be applied (application data), that is to say the operating data which are to be coordinated, can be changed only offline, and not online, which makes rapid application optimized on the basis of the operating state, for example, more difficult. In this case, the applied, that is to say changed, data can be activated, i.e. loaded into the flash memory, only by a complete programming operation. Although the advantage arises that data can be applied using mass-produced control units without modification, considerable time delays and complex handling are involved in practice, which results in that this method is not very efficient.

Alternatively, data can be applied using specific application units in which the data area of the flash memory provided for the operating data that are to be applied is replaced with a random access memory (RAM). This procedure permits all application data to be rapidly changed as desired, but requires control units specifically modified for the purpose. Therefore, the data can no longer be applied using mass-produced control units. Another alternative worth considering may be to apply data in accordance with the master/slave concept, where only the essential input/output functions run on the target control unit (slave). The main unit (master) handles all the functional software. In addition, the master unit holds all the application data, which can be configured to be changeable as desired for the purposes of application. In this case too, data can no longer be applied using mass-produced control units. Furthermore, it is also necessary to ensure that the timing and functional response is identical to that of the master/slave configuration when the entire scope of functions is transferred to the target control unit.

SUMMARY OF THE INVENTION

It is accordingly an object of the invention to provide a method for applying control data for an electronic motor vehicle control unit which overcomes the above-mentioned disadvantages of the prior art methods of this general type, which permits data to be applied rapidly without the need for specific application units.

With the foregoing and other objects in view there is provided, in accordance with the invention, a method for applying/updating control data for an electronic motor vehicle control unit. The method includes the step of storing control data records in a first memory area of a nonvolatile memory. The control data records relate to a motor vehicle component which is to be controlled and/or a motor vehicle type. A control data record of the control data records is copied to a second memory area of the nonvolatile memory in order to apply/update the control data record. A section of the control data record stored in the second memory area is stored in a further memory. The section of the control data record stored in the further memory is accessed, and the control data of the section of the control data record which is to be applied is updated resulting in updated control data. The updated control data is to be used for controlling the motor vehicle component that is to be controlled. The updated control data is written back to the second memory area resulting in an updated control data record.

The method according to the invention permits efficient application for mass-produced control units, that is to say control units which are produced in large numbers for actual operational control and are not configured for a specific form of application. Such control units need not be modified, that is to say neither an additional RAM nor a ROM emulation by a RAM etc. is required. In addition, online application in the motor vehicle is possible, in which case, by way of example, the data in the RAM are coordinated (applied) during the journey. However, there is additionally the option of offline application as well, for example on the laboratory bench. Furthermore, data can be applied (coordinated or updated) quickly, since there is no need for any type of unit change or intervention in a unit.

The invention therefore provides a very efficient system configuration for motor vehicle control, for example an integrated transmission control. The invention can also be used, in particular, in control units that have a very limited memory size and, by way of example, are based on a microcontroller configuration. This permits the use of (purely electronic or mechatronic) control units which operate simply and efficiently, are economical, have a low space requirement and are distinguished by high quality and reliability. However, the invention permits not only the use of such control units having microcontrollers and integrated memory configurations but also, specifically configured control units can be used in addition to mass-produced control units.

The invention permits the use of control units based on a microcontroller configuration with efficient utilization of memory resources, without the need for any changes to the hardware structure. Furthermore, no dedicated application units are required. The total memory space requirement for the application is very low since only a relatively small memory size need be provided in the flash memory for the (second) memory area. The RAM also need only provide small memory capacities for the application, since only the data to be applied need be read into the RAM, while the rest of the operating data, which remain unchanged, can be read from the appropriate memory area of the nonvolatile memory for current component control. According to the invention, the control unit data record in the nonvolatile memory (in particular, flash memory, but also EEPROM or the like) can have various configurations, with the option of dynamically transferring individual data segments having a size of, by way of example, 1 kilobyte to the RAM area for online application, and storing them back in the nonvolatile memory within the control unit after application.

In accordance with an added mode of the invention, there is the step of writing all the control data present in the second memory area to the first memory area.

In accordance with an additional mode of the invention, there is the step of writing back the updated control data record to a same point in the first memory area from which the control data record had been read before it was applied/updated.

In accordance with another mode of the invention, there is the step of transferring the control data of the control data record located in the second memory area which are to be applied/updated in sections to the further memory. The control data are updated there and are stored back, and this operation is repeated for the next control data record sections located in the second memory area which are to be applied/updated.

In accordance with a further mode of the invention, there is the step of setting pointers that point to addresses of the control data record to be applied/updated in the second memory area and in the further memory, respectively.

In accordance with another added mode of the invention, there is the step of providing a further, nonvolatile memory to be accessed for selecting the control data record and outputting positions at which the control data record is located in the first memory area.

In accordance with another additional mode of the invention, there is the step of reprogramming the electronic motor vehicle control unit such that it accesses the positions of the updated control data record located in the first memory area irrespective of a content of the further, nonvolatile memory when the application is terminated.

In accordance with yet another mode of the invention, there is the step of embodying the further memory as a random access memory.

In accordance with an added mode of the invention, during the accessing step, there is the further step of accessing further control data stored in the second memory area and updating the further control data resulting in further updated control data. The further updated control data is used for controlling the motor vehicle component that is to be controlled.

In accordance with a further mode of the invention, there is the step of embodying the nonvolatile memory as a flash memory.

In accordance with another mode of the invention, there is the step of writing back the updated control data present in the second memory to the first memory area.

In accordance with a concomitant mode of the invention, during the reprogramming step, there is the step of permanently storing access addresses of the updated control data record located in the first memory area.

Other features which are considered as characteristic for the invention are set forth in the appended claims.

Although the invention is illustrated and described herein as embodied in a method for applying control data for an electronic motor vehicle control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a block diagram showing the individual method steps in conjunction with a hardware configuration of the concept according to the invention in relatively great detail.

DESCRIPTION OF THE PREFERRED EMBODIMENTS

Figure 1:
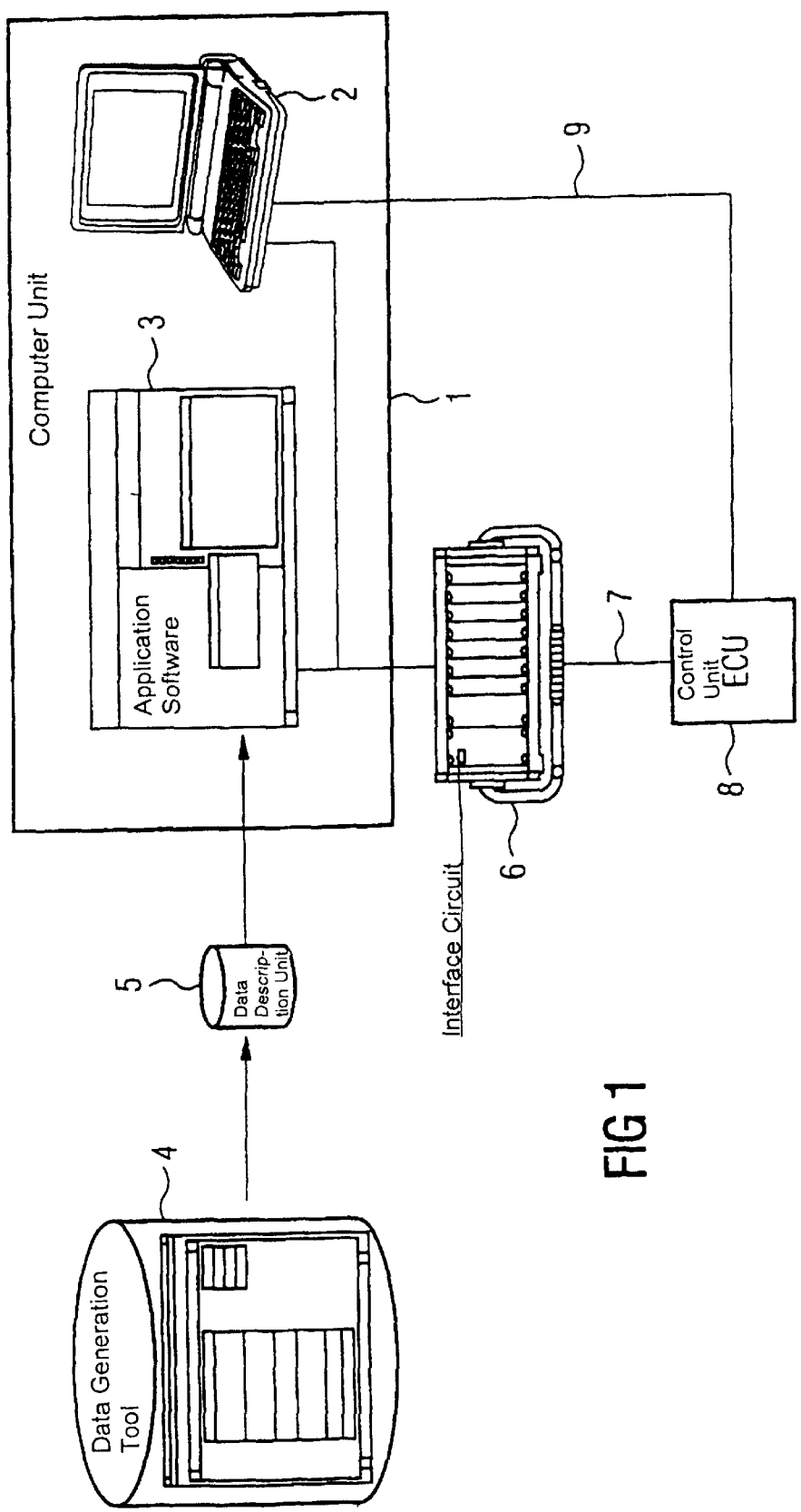
FIG. 1 is a block diagram of an illustrative embodiment suitable for carrying out the method according to the invention.

In all the figures of the drawing, sub-features and integral parts that correspond to one another bear the same reference symbol in each case. Referring now to the figures of the drawing in detail and first, particularly, to FIG. 1 thereof, there is shown an illustrative embodiment containing a computer unit 1 for application control, which unit may contain or be formed by a portable PC 2 and is equipped with the application software denoted schematically by 3, including software (flash tool) which effects memory management (storage, reading, erasure). Control unit data which are to be applied should the occasion arise are produced or provided by a data generation tool 4 which supplies the files for the control unit program, that is to say the source code (usually written in the programming language C). The data generation tool 4 also produces a data description, for example using a data description unit 5 (shown separately in FIG. 1) which is regularly produced by software and forms the data into appropriate data words, for example using an identification which characterizes the data type, data headers etc, for operation of the application software 3. The computer unit 1 forms a user interface which can be used to read and modify the control unit data, using information (data description) from the data description unit 5 for this purpose.

In FIG. 1, the control unit to be applied, whose control data need to be matched to the current or desired operation, is denoted by the reference numeral 8. The control unit 8 and the computer unit 1 can communicate via a serial line 9 and a serial interface (optional) or via a bus 7 (for example controller area network (CAN)) and an appropriate bus interface and also an interface circuit 6. In FIG. 1, both communication alternatives are implemented together. In practice, however, one of the two communication links is also sufficient.

FIG. 2 is a more detailed illustration of a memory structure of the control unit 8, to the extent relevant in the present case, in conjunction with individual program functional blocks. The nonvolatile memory provided is a flash memory 10 that contains a memory section 11, containing a control unit program, and also further memory sections 12 to 14. In addition, the flash memory 10 contains a boot area 15 for bootstrapping the processor (microcontroller), which is not shown, of the control unit 8. On a general basis, the program stored in the memory section 11 determines the operating cycle of the control unit 8, while the data which are stored in the memory areas 12 and 14 and are to be applied (updated) should the occasion arise influence the operating cycle and, by way of example, define the type and the amplitude of driving of output drivers. The memory area 12 of the flash memory 10 contains at least one control unit data record used for controlling a motor vehicle function which is to be controlled by the control unit 8, i.e. the individual components (e.g. transmission actuators) which are to be driven for this purpose. Preferably, however, as shown in FIG. 2, a plurality of alternative control unit data records, for example for different motor vehicle types, are provided. According to FIG. 2, three different variants "variant 1", "variant 2", "variant 3" are provided for each of the individual components which are to be controlled "component 1", "component 2", etc. (depending on the configuration, just two or else more than three alternative control data records (variants) can, of course, also be prescribed). In this context, the components represent the operating elements, for example actuators, valves, relays and the like, which can be actuated by the control unit 8 (and, in the case of a mechatronic control unit, may be held in the mechatronic control unit). The variants cover different vehicle types, shift patterns or the like on the basis of which the respective components are each to be controlled in a different way.

As FIG. 2 shows, at the beginning, in a step 100, the program and the control unit data are written to the memory areas 11 and 12, respectively, from a program file 17 and from a data record file 18, respectively, using the flash tool program 3 shown in FIG. 1. The control unit data records located in the memory area 12, after this initial storage step, correspond to the originally produced data that have not yet been applied. To select a desired control unit data record, an EEPROM 16 contained in the control unit 8 is accessed in accordance with step 200 "variant coding" and the variant which is to be chosen, for example the desired specific vehicle type or the desired performance pattern, is signaled to the EEPROM 16, preferably in coded form. The EEPROM 16 is programmed such that, on the basis of the selected variant, it points to the appropriate memory sections of the memory area 12 that contain this variant, or to the appropriate memory addresses thereof. In the example shown in FIG. 2, the EEPROM 16 points to "variant 2" for "component 1" and to "variant 1" for "component 2" etc., which thus represent the control unit data record which is to be selected. To activate the selected control unit data, the data are copied to the memory area 14 by the control unit 8 in method step 300, so that the memory area 14 stores all the selected control unit data required for function control. From the memory area 14, the control unit data stored there are available to the control unit program for processing. The control unit program therefore need not access the individual control unit data distributed throughout the memory area 12, but instead finds the necessary data compiled in the memory area 14. The control unit program accesses the data in the memory area 14 using pointers that signal the addresses of the individual memory positions.

During the development and matching phase, the control unit data need to be matched to the respective vehicle type. This is preferably done by modifying the control unit data and monitoring the reactions of the motor vehicle. To allow this phase to be carried out quickly and meaningfully, at least some of the data from the memory area 14 are preferably transferred to a RAM 19, so that they are available online to a certain extent and can be changed directly and rapidly. Although it is conceivable for all the control unit data to be transferred to the RAM 19, this requires a large amount of free memory capacity. So that the RAM 19 with a relatively small amount of free memory capacity can also be used, the applier selects, preferably before data are coordinated, that subrange of the control unit data, for example one kilobyte, which he would like to coordinate. The control unit 8 then copies the selected data from the memory area 14 to the RAM 19 in step 400 and also changes over the pointer provided for these data from the memory area 14 to the RAM area. Hence, from this time onward, the control unit program operates with the data held in the RAM 19. The data are thus now applied, that is to say are modified (updated) and coordinated using the application tool program, very rapidly without the need for the flash memory 10 to be accessed for the purposes of application, see method step 500 "online application using application tool, address conversion by control unit". In this context, the control unit 8 converts the addresses which are to be addressed such that the control unit data which are currently applied or are to be applied are removed from the RAM 19, whereas the data which do not need to be applied but are necessary for operation of the motor vehicle function, e.g. the transmission, are taken from the flash memory 10. As soon as the application operations for the data subrange stored in the RAM 19 have terminated, the control unit data which are stored in the RAM 19 and at least some of which are applied are written back (flashed back) to the memory area 14 of the flash memory again at the request of the applier, the necessary erasure operations in the appropriate flash sector being carried out prior to that. Preferably, step 600 takes place such that the control unit data which are located in a segment (which is 8 kilobytes wide, for example) of the memory area 14 of the flash memory 10 and for which no application has been carried out are transferred to the RAM 19 in addition to the applied data already located in the RAM 19, so that the RAM 19 now contains a complete control unit data record (or a part of such a control unit data record) containing the applied control unit data and the control unit data which have remained unchanged, application of the latter not yet having been required or carried out.

The appropriate segment of the memory area 14 is then erased and the data record located in the RAM 19 is then written back to this segment. If required, this operation can be carried out for a second segment of the memory area 14, which is 8 kilobytes wide, for example. The memory area 14 now contains a complete, at least partially applied control unit data record for the appropriate vehicle type. If one or more further data subranges with a size of, by way of example, one kilobyte are to be applied, the aforementioned steps can be repeated until the memory area 14 contains a fully applied control unit data record.

Preferably, the fully applied control unit data located in the memory area 14 are finally copied back to their appropriate starting positions in the memory area 12 in a step which is the reverse of step 300. In the example shown in FIG. 2, this means that the areas "component 1, variant 2" and "component 2, variant 1" are overwritten with the appropriately applied control unit data. During subsequent motor vehicle operation, the flash memory 10 can thus be accessed in accordance with the basic program, with access to the sections of the memory area 12 that are denoted by the EEPROM 16. No type of readdressing, reprogramming or other intervention in the control unit is necessary. Nevertheless, the fact that the applied control unit data are written to their starting positions ensures that the applied, that is to say optimally matched, control unit data are always accessed during subsequent control unit operation.

If the extent of all of the control unit data to be applied were to be greater than the memory capacity of the memory area 14, steps 300 to 600 can also be repeated for control data record subsections, with data finally being stored back from the memory area 14 to the memory area 12, only a subrange of all the control unit data to be applied which can be held by the memory area 14 being coordinated in each case. Data can thus be applied with only a small memory space requirement overall, the applied control unit data being stored in nonvolatile fashion at a fixed address location, according to their original addresses, after application has terminated.

The invention thus requires no changes to the hardware structure, which results in that original or mass-produced control units can be used. Hence, no specific, expensive application units are required, at least some of which would, in addition, need to be changed, involving considerable effort. A further advantage is that all the data are generally accessed by use of pointers, so that variable data structures can also be used and processed without difficulty. The method according to the invention can also proceed very rapidly, that is to say with optimum timing, since no program algorithms with efficient execution times are required for data access. In addition, the application software is relatively simple to manage, and commercially available application tools may possibly also be used without complex tool changes. The invention also permits a number of data variants to be managed in one piece of control unit software, the data for the currently chosen variant also being located at a fixed address after application. This allows, by way of example, simple transfer to programming at the end of the production line.

In a further refinement of the invention, end-of-production-line coding of the data variant used to access the EEPROM 16 during application can also be replaced with end-of-production-line programming within the control unit after application, the effect achieved by this being that, during subsequent operation control, the same memory sections of the memory area 12 are accessed as had been signaled hitherto by the EEPROM 16. After such programming, the EEPROM content is no longer necessary and can be erased or transcribed. This permits error immunity to be increased, since any failure of the EEPROM 16 has no adverse effects. In addition, manipulation attempts in which the aim is to manipulate the content of the EEPROM 16 and/or to read it without authorization are also prevented, since such manipulation or attempts at analysis in the EEPROM neither convey information nor have effects on control unit operation. During end-of-production-line programming within the control unit, the access addresses of the first memory area 12 at which the updated control data record is located can be permanently stored, for example.

We claim:

1. A method for applying/updating control data for an electronic motor vehicle control unit, which comprises the steps of:

storing control data records in a first memory area of a nonvolatile memory, the control data records relate to at least one of a motor vehicle component which is to be controlled and a motor vehicle type;

copying a control data record of the control data records to a second memory area of the nonvolatile memory in order to apply/update the control data record;

storing a section of the control data record stored in the second memory area in a further memory;

accessing the section of the control data record stored in the further memory, and updating the control data of the section of the control data record which is to be applied resulting in updated control data, the updated control data is to be used for controlling the motor vehicle component which is to be controlled; and writing the updated control data back to the second memory area resulting in an updated control data record.

2. The method according to claim 1, which comprises writing all the control data present in the second memory area to the first memory area.

3. The method according to claim 2, which comprises writing back the updated control data record to a same point in the first memory area from which the control data record had been read before it was applied/updated.

4. The method according to claim 3, which comprises providing a further, nonvolatile memory to be accessed for selecting the control data record and outputting positions at which the control data record is located in the first memory area.

5. The method according to claim 4, which comprises reprogramming the electronic motor vehicle control unit such that it accesses the positions of the updated control data record located in the first memory area irrespective of a content of the further, nonvolatile memory when an application is terminated.

6. The method according to claim 5, which comprises during the reprogramming step, permanently storing access addresses of the updated control data record located in the first memory area.

7. The method according to claim 1, which comprises transferring the control data of the control data record located in the second memory area which are to be applied/updated in sections to the further memory, the control data are updated there and are stored back, and repeating this operation for next control data record sections located in the second memory area which are to be applied/updated.

8. The method according to claim 1, which comprises setting pointers which point to addresses of the control data record to be applied/updated in the second memory area and in the further memory, respectively.

9. The method according to claim 1, which comprises embodying the further memory as a random access memory.

10. The method according to claim 1, which comprises during the accessing step, accessing further control data stored in the second memory area and updating the further control data resulting in further updated control data, the further updated control data is to be used for controlling the motor vehicle component which is to be controlled.

11. The method according to claim 1, which comprises embodying the nonvolatile memory as a flash memory.

12. The method according to claim 1, which comprises writing back the updated control data present in the second memory to the first memory area.

* * * * *